(12) United States Patent
Wu et al.

(10) Patent No.: US 11,628,709 B2
(45) Date of Patent: Apr. 18, 2023

(54) ANTI-GLARE DEVICE, CONTROL METHOD AND VEHICLE

(71) Applicant: BOE TECHNOLOGY GROUP CO., LTD., Beijing (CN)

(72) Inventors: Naifu Wu, Beijing (CN); Xitong Ma, Beijing (CN); Lixin Kou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 612 days.

(21) Appl. No.: 16/606,145

(22) PCT Filed: Dec. 24, 2018

(86) PCT No.: PCT/CN2018/123046
§ 371 (c)(1),
(2) Date: Oct. 17, 2019

(87) PCT Pub. No.: WO2019/184472
PCT Pub. Date: Oct. 3, 2019

(65) Prior Publication Data
US 2020/0039334 A1 Feb. 6, 2020

(30) Foreign Application Priority Data

Mar. 26, 2018 (CN) .......................... 201810251894.X

(51) Int. Cl.
*G02F 1/15* (2019.01)
*G02F 1/153* (2006.01)
(Continued)

(52) U.S. Cl.
CPC . *B60J 3/04* (2013.01); *B60J 1/02* (2013.01); *G02F 1/155* (2013.01); *G02F 1/163* (2013.01)

(58) Field of Classification Search
CPC ...... G02F 1/155; G02F 1/1523; G02F 1/1525; G02F 1/1521; G02F 1/163; G02F 1/1533;
(Continued)

(56) References Cited

U.S. PATENT DOCUMENTS

| 5,305,012 A | * | 4/1994 | Faris | ....................... A61F 9/023 |
| | | | | 359/604 |
| 8,140,219 B2 | * | 3/2012 | Cernasov | ............... G02C 7/101 |
| | | | | 359/601 |

(Continued)

FOREIGN PATENT DOCUMENTS

| CN | 2765808 Y | 3/2006 |
| CN | 1938642 A | 3/2007 |

(Continued)

OTHER PUBLICATIONS

Office Action of CN Application No. 201810251894.X, dated Nov. 26, 2019, 7 pages.
(Continued)

*Primary Examiner* — Dawayne Pinkney
(74) *Attorney, Agent, or Firm* — Muncy, Geissler, Olds & Lowe, P.C.

(57) ABSTRACT

The present disclosure provides an anti-glare device, a control method and a vehicle. The anti-glare device includes a sensing circuit, a driving circuit and an electrically-controlled color-variable thin film. The sensing circuit is configured to acquire status information about the vehicle in a running state. The driving circuit is configured to generate a driving signal for the electrically-controlled color-variable thin film in accordance with the status information. The electrically-controlled color-variable thin film is arranged on a front windshield of the vehicle and configured to change a transmittance to external light beam in accordance with the driving signal.

14 Claims, 5 Drawing Sheets

(51) Int. Cl.
*G02F 1/157* (2006.01)
*G09G 3/19* (2006.01)
*G02B 26/00* (2006.01)
*B60J 3/04* (2006.01)
*B60J 1/02* (2006.01)
*G02F 1/155* (2006.01)
*G02F 1/163* (2006.01)

(58) Field of Classification Search
CPC . G02F 1/03; G02F 1/0316; G02F 3/16; C09K 9/02; B60R 1/088; H04N 9/3137; H04N 9/22
USPC ............... 359/265–275, 277, 245–247, 242; 345/49, 105, 107; 248/817; 438/929
See application file for complete search history.

(56) References Cited

U.S. PATENT DOCUMENTS

| | | |
|---|---|---|
| 2003/0169213 A1 | 9/2003 | Spero |
| 2007/0133078 A1 | 6/2007 | Fanton et al. |
| 2016/0159206 A1* | 6/2016 | Nakashima ............ G02B 26/02 250/201.1 |
| 2016/0363779 A1 | 12/2016 | Huang et al. |
| 2016/0370637 A1 | 12/2016 | Lee |
| 2019/0118624 A1 | 4/2019 | Chu |
| 2019/0137841 A1 | 5/2019 | Koo et al. |

FOREIGN PATENT DOCUMENTS

| | | | |
|---|---|---|---|
| CN | 201317244 Y | 9/2009 | |
| CN | 103207456 A | 7/2013 | |
| CN | 104238223 A | 12/2014 | |
| CN | 205498565 U | 8/2016 | |
| CN | 105929576 A | 9/2016 | |
| CN | 106143072 A | 11/2016 | |
| CN | 106166986 A | 11/2016 | |
| CN | 205736830 U | 11/2016 | |
| CN | 106200187 A | 12/2016 | |
| CN | 106994884 A | 8/2017 | |
| DE | 4128717 A1 * | 3/1993 | ................ B60J 3/04 |
| DE | 102004050987 A1 * | 12/2005 | ....... B32B 17/10036 |
| WO | WO-2017175941 A1 | 10/2017 | |
| WO | 2017190166 A1 | 11/2017 | |

OTHER PUBLICATIONS

International Search Report of PCT/CN2018/123046, dated Apr. 3, 2019, 10 pages.

"Why is the electrochromic film discolored?" published Jul. 17, 2015 on http://www.wsm.cn, 1 page.

Extended European Search Report dated Nov. 19, 2021 in corresponding EP Application 18912921.6, 9 pages.

* cited by examiner

ANTI-GLARE DEVICE, CONTROL METHOD AND VEHICLE

CROSS-REFERENCE TO RELATED APPLICATION

This application is the U.S. national phase of PCT Application No. PCT/CN2018/123046 filed on Dec. 24, 2018, which claims priority to Chinese Patent Application No. 201810251894.X filed on Mar. 26, 2018, the disclosures of which are incorporated in their entirety by reference herein.

TECHNICAL FIELD

The present disclosure relates to the field of traffic safety technology, in particular to an anti-glare device, a control method and a vehicle.

BACKGROUND

As a source of potential traffic danger which is difficult to solve, drivers' sight is interfered by incoming lamplight when two vehicles meet. Especially when the vehicle runs at a high speed, usually the driver may not turn off a high-beam lamp so as to see clearly a road ahead. Statistically, more than 80% high-speed traffic accidents happen in the night, and a part of these traffic accidents are mainly caused by interference to the drivers' sight due to the incoming lamplight and an erroneous driving operation due to a decline in judgment.

SUMMARY

In one aspect, the present disclosure provides in some embodiments an anti-glare device for a vehicle, including a sensing circuit, a driving circuit and an electrically-controlled color-variable thin film. The sensing circuit is configured to acquire status information about the vehicle in a running state. The driving circuit is configured to generate a driving signal for the electrically-controlled color-variable thin film in accordance with the status information. The electrically-controlled color-variable thin film is disposed on a front windshield of the vehicle and is configured to change a transmittance to external light beam in accordance with the driving signal.

In a possible embodiment of the present disclosure, the electrically-controlled color-variable thin film includes a first transparent electrode layer, a second transparent electrode layer, and an electrically-controlled color-variable layer arranged between the first transparent electrode layer and the second transparent electrode layer. Each of the first transparent electrode layer and the second transparent electrode layer consists of a plurality of transparent strip electrodes, and each strip-like electrode of the first transparent electrode layer is arranged opposite to a corresponding strip-like electrode of the second transparent electrode layer.

In a possible embodiment of the present disclosure, an orthographic projection of each one of the plurality of transparent strip electrodes of the first transparent electrode layer on the electrically-controlled color-variable thin film overlaps with an orthographic projection of one of the plurality of transparent strip electrodes of the second transparent electrode layer on the electrically-controlled color-variable thin film.

In a possible embodiment of the present disclosure, the plurality of transparent strip electrodes of the first transparent electrode layer is arranged in a matrix form, and the plurality of transparent strip electrodes of the second transparent electrode layer is arranged in a matrix form.

In a possible embodiment of the present disclosure, the status information includes an irradiation direction of the external light beam. The sensing circuit includes a wide-angle camera arranged on a vehicle body and configured to take an image in front of the vehicle, perform grayscale processing to treatment, determine relative coordinates in the image where the external light beam has an intensity exceeding an intensity threshold, and calculate highlight coordinates of the external light beam having the intensity exceeding the intensity threshold in combination with a position of the wide-angle camera on the vehicle body, so as to acquire the irradiation direction. The driving circuit is further configured to determine a position of a color-variable region in the electrically-controlled color-variable thin film in accordance with the irradiation direction.

In a possible embodiment of the present disclosure, the driving circuit is further configured to compare the irradiation direction with a stored correspondence between irradiation direction and color-variable regions, and determine the position of the color-variable region on the electrically-controlled color-variable thin film.

In a possible embodiment of the present disclosure, the electrically-controlled color-variable thin film is further configured to supply power alternately to transparent strip electrodes in the color-variable region in the plurality of strip-like electrodes of the first transparent electrode layer, so as to form a plurality of light-shielding stripes spaced from each other.

In a possible embodiment of the present disclosure, the status information further includes a velocity $v$ of the vehicle, a distance between the vehicle and a central line of a road viewed by the driver through the color-variable region, and a movement direction of the central line of the road relative to the driver viewed by the driver through the color-variable region, and the central line of the road is a central line between two parts of the road in two opposite running directions respectively. The sensing circuit further includes a vehicle velocity sensor and a binocular camera. The vehicle velocity sensor is configured to detect the velocity $v$ of the vehicle. The binocular camera includes two cameras arranged at surfaces of two rearview mirrors facing a head of the vehicle respectively, and configured to take the images through the two cameras, compare the images taken by the two cameras with each other, calculate the distance between the vehicle and the central line of the road viewed by the driver through the color-variable region, and identify the movement direction of the central line of the road relative to the driver viewed by the driver through the color-variable region by comparing the images taken by the two cameras with each other. The driving circuit is further configured to: determine an arrangement direction of the light-shielding stripes in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region; determine a distance $z$ between adjacent light-shielding stripes in accordance with the distance $x$ between the vehicle and the central line of the road viewed by the driver through the color-variable region through the equation $$z = \frac{sy}{x+y},$$

where s is a constant value within a range [50 cm, 100 cm], and y represents a distance between the driver and the front windshield; determine a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and take the arrangement direction of the light-shielding stripes, the distance between adjacent light-shielding stripes and the flicker frequency f as driving information.

In a possible embodiment of the present disclosure, the electrically-controlled color-variable thin film is further configured to supply power alternately to the transparent strip electrodes in the color-variable region in the plurality of transparent strip electrodes of the first transparent electrode layer and the second transparent electrode layer in accordance with the arrangement direction of the light-shielding stripes, the distance between the adjacent light-shielding stripes, and the flicker frequency f.

In a possible embodiment of the present disclosure, the transmittance of the color-variable region to the external light beam is 0 or smaller than or equal to 40%.

In another aspect, the present disclosure provides in some embodiments a control method for the above-mentioned anti-glare device, including: acquiring status information about a vehicle in a running state; generating a driving signal for an electrically-controlled color-variable thin film in accordance with the status information, and transmitting the driving signal to the electrically-controlled color-variable thin film; and supplying power alternately to transparent strip electrodes in a color-variable region in a plurality of transparent strip electrodes of a first transparent electrode layer of the electrically-controlled color-variable thin film, so as to form a plurality of light-shielding stripes spaced apart from each other.

In a possible embodiment of the present disclosure, the acquiring the status information about the vehicle in the running state includes: taking an image in front of the vehicle through a wide-angle camera, subjecting the image to grayscale treatment, determining relative coordinates of external light beam having an intensity exceeding an intensity threshold, and calculating highlight coordinates of the external light beam having the intensity exceeding the intensity threshold in combination with a position of the wide-angle camera on a vehicle body, so as to acquire an irradiation direction; and determining a position of the color-variable region in accordance with the irradiation direction.

In a possible embodiment of the present disclosure, the determining the position of the color-variable region in accordance with the irradiation direction includes comparing the irradiation direction with a stored correspondence between irradiation directions and color-variable regions, and determining the position of the color-variable region on the electrically-controlled color-variable thin film.

In a possible embodiment of the present disclosure, the status information further includes a velocity v of the vehicle, a distance between the vehicle and a central line of a road viewed by the driver through the color-variable region, and a movement direction of the central line of the road relative to the driver viewed by the driver through the color-variable region, and the central line of the road is a central line between two parts of the road in two opposite running directions respectively. The generating the driving signal for the electrically-controlled color-variable thin film in accordance with the status information includes: determining an arrangement direction of the light-shielding stripes in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region; determining a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield; determining a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and taking the arrangement direction of the light-shielding stripes, the distance between adjacent light-shielding stripes and the flicker frequency f as driving information.

In a possible embodiment of the present disclosure, prior to determining the arrangement direction of the light-shielding stripes in accordance with the movement direction of the central line of the road relative to the driver viewed by the driver through the color-variable region, the control method further includes taking images through two cameras, comparing the images taken by the two cameras, and identifying the movement direction of the central line of the road relative to the driver viewed by the driver through the color-variable region.

In a possible embodiment of the present disclosure, prior to determining the distance z between the adjacent light-shielding stripes in accordance with the distance x between the vehicle and the central line of the road viewed by the driver through the color-variable region, the control method further includes comparing the images taken by the two cameras, and calculating the distance between the vehicle and the central line of the road viewed by the driver through the color-variable region.

In a possible embodiment of the present disclosure, prior to determining the flicker frequency f of the light-shielding stripe in accordance with the velocity v of the vehicle, the control method further includes acquiring the velocity v of the vehicle.

In a possible embodiment of the present disclosure, the supplying power alternately to the transparent strip electrodes in the color-variable region in the plurality of transparent strip electrodes of the first transparent electrode layer and the second transparent electrode layer of the electrically-controlled color-variable thin film so as to form the plurality of light-shielding stripes spaced apart from each other includes supplying power alternately to the transparent strip electrodes in the color-variable region in the plurality of transparent strip electrodes of the first transparent electrode layer in accordance with the arrangement direction of the light-shielding stripes, the distance between the adjacent light-shielding stripes, and the flicker frequency f as well as the driving information.

In yet another aspect, the present disclosure provides in some embodiments a vehicle, including a front windshield and the above-mentioned anti-glare device. An electrically-controlled color-variable thin film of the anti-glare device is arranged on the front windshield.

In still yet another aspect, the present disclosure provides in some embodiments a computer device, including a processor, a memory, and a computer program stored in the memory and executed by the processor. The computer program is executed by the processor so as to implement the above-mentioned control method.

In still yet another aspect, the present disclosure provides in some embodiments a computer-readable storage medium storing therein a computer program. The computer program is executed by a processor so as to implement the above-mentioned control method.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure. In addition, for clarification, any known function and structure will not be described hereinafter.

It should be appreciated that, such phrases as "one embodiment" and "one of the embodiments" intend to indicate that the features, structures or characteristics are contained in at least one embodiment of the present disclosure, rather than referring to a same embodiment. In addition, the features, structures or characteristics may be combined in any embodiment or embodiments in an appropriate manner.

It should be further appreciated that, serial numbers of the steps shall not be used to define the order of the steps, and instead, the order of the steps shall be determined in accordance with their functions and internal logics.

An object of the present disclosure is to provide a scheme, so as to prevent the occurrence of a potential danger caused when a line of sight of a driver is disturbed by light.

Figure 1:
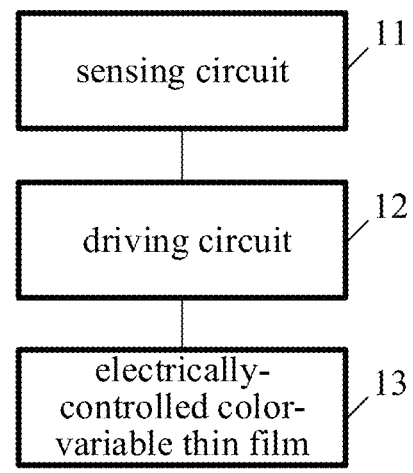
FIG. 1 is a schematic view showing an anti-glare device according to one embodiment of the present disclosure.
Figure 2:
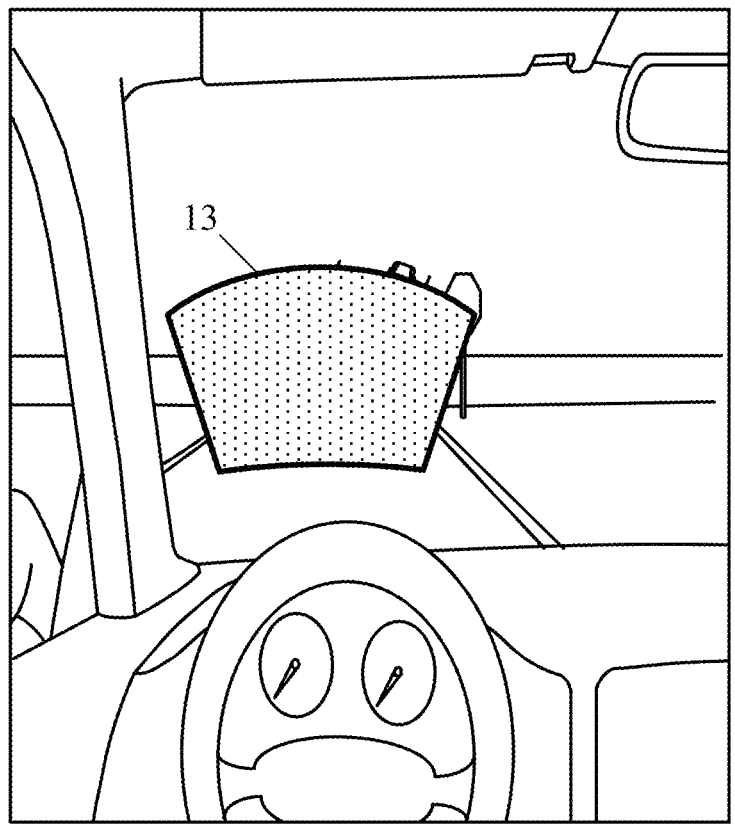
FIG. 2 is a schematic view showing a situation w here an electrically-controlled color-variable thin film of the anti-glare device is arranged on a front windshield of a vehicle according to one embodiment of the present disclosure.

The present disclosure provides in some embodiments an anti-glare device which, as shown in FIGS. 1 and 2, includes a sensing circuit 11, a driving circuit 12 and an electrically-controlled color-variable thin film 13. The sensing circuit 11 is configured to acquire status information about a vehicle in a running state. The driving circuit 12 is configured to generate a driving signal for the electrically-controlled color-variable thin film 13 in accordance with the status information. The electrically-controlled color-variable thin film 13 is arranged on a front windshield of the vehicle, and configured to form a color-variable region in accordance with the driving signal so as to change a transmittance to external light beam.

According to the anti-glare device in the embodiments of the present disclosure, it is able to change a color of the electrically-controlled color-variable thin film, and change the transmittance of the electrically-controlled color-variable thin film to the external light beam, thereby to prevent a line of sight of a driver from being disturbed by the external light beam, and achieve an anti-glare effect.

In a word, through the anti-glare device in the embodiments of the present disclosure, it is able to improve the driving security, so it has a high practical value.

The anti-glare device will be described hereinafter in more details.

To be specific, the color-variable region of the electrically-controlled color-variable thin film 13 may be a grating structure consisting of a plurality of light-shielding stripes spaced apart from each other. Through the grating structure, it is able to partially shield the external light beams, thereby to prevent the driver from feeling uncomfortable due to a large quantity of external light beams passing through the front windshield. In actual use, the electrically-controlled color-variable thin film 13 may be arranged on the left of the front windshield of the vehicle, so as to prevent the line of sight of the driver from being disturbed by lamplight from a vehicle running an opposite direction.

Figure 3:
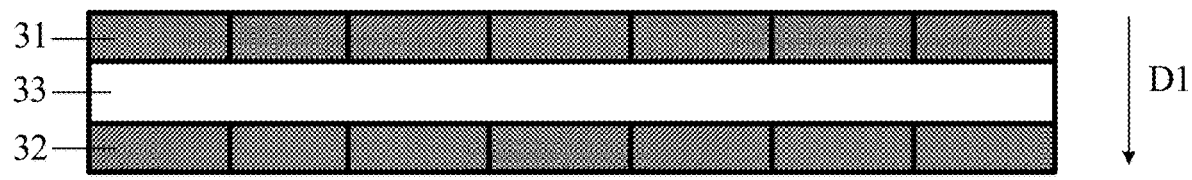
FIG. 3 is a sectional view of the electrically-control color-variable thin film of the anti-glare device according to one embodiment of the present disclosure.
Figure 4:
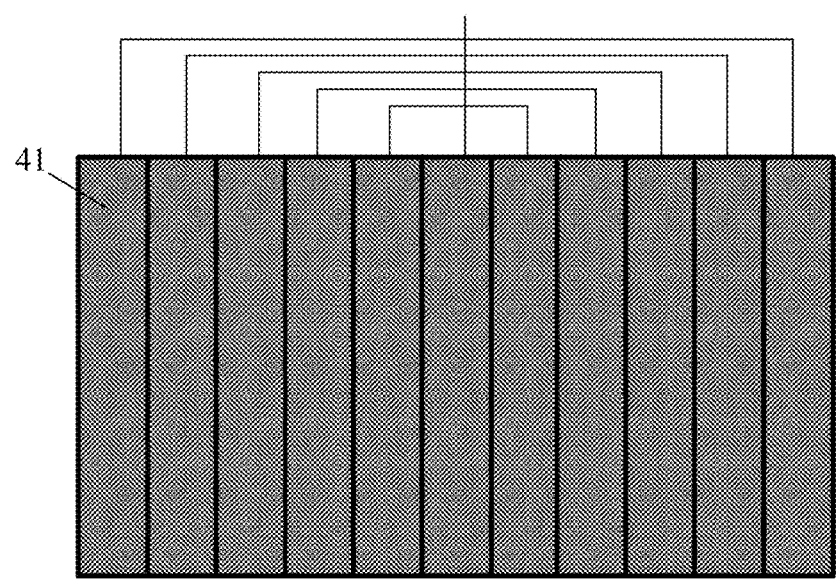
FIG. 4 is a top view of the electrically-control color-variable thin film of the anti-glare device according to one embodiment of the present disclosure.

As shown in FIGS. 3 and 4, the electrically-controlled color-variable thin film 13 may mainly include a first transparent electrode layer 31, a second transparent electrode layer 32, and an electrically-controlled color-variable layer 33 arranged between the first transparent electrode layer 31 and the second transparent electrode layer 32.

Each of the first transparent electrode layer 31 and the second transparent electrode layer 32 may consist of a plurality of transparent strip electrodes 41, and each strip-like electrode 41 of the first transparent electrode layer 31 may be arranged opposite to a corresponding strip-like electrode 41 of the second transparent electrode layer 32. In a possible embodiment of the present disclosure, as shown in FIG. 3, the strip-like electrodes 41 of the first transparent electrode layer 31 may be arranged opposite to the strip-like electrodes 41 of the second transparent electrode layer 32 in a one-to-one correspondence manner in a widthwise direction of the electrically-controlled color-variable thin film 13 (e.g., a direction indicated by D1 in FIG. 3, i.e., a direction from the first transparent electrode layer 31 to the second transparent electrode layer 32). In a possible embodiment of the present disclosure, the plurality of transparent strip electrodes of the first transparent electrode layer may be arranged in a matrix form, i.e., in rows and columns, the plurality of transparent strip electrodes of the second transparent electrode layer may be arranged in a matrix form, i.e., in rows and columns, and the strip-like electrodes of the first transparent electrode layer may be arranged opposite to the strip-like electrodes of the second transparent electrode layer in a one-to-one correspondence manner in the widthwise direction of the electrically-controlled color-variable thin film.

A voltage may be applied to the strip-like electrodes 41 of the first transparent electrode layer 31 and the second transparent electrode layer 32, so as to enable positive or negative ions to be migrated to the electrically-controlled color-variable layer 33, thereby to enable the electrically-controlled color-variable layer 33 to generate a colored compound reversibly, and visually exhibit the light-shielding stripes of the grating structure. One light-shielding stripe may be formed when a color of the electrically-controlled color-variable layer 33 changes under the control of one or more strip-like electrodes 41.

Based on the structure of the electrically-control color-variable thin film, it is able to form the grating structure consisting of the plurality of light-shielding stripes in the color-variable region.

To be specific, a part of the electrically-controlled color-variable thin film 13 may form the color-variable region in accordance with the driving signal, so as to provide an anti-glare function for the driver. Alternatively, all the electrically-controlled color-variable thin film 13 may form the color-variable region in accordance with the driving signal, so as to provide the anti-glare function for the driver. In other words, a part of, or all, the electrically-controlled color-variable thin film 13 may selectively form the color-variable region in accordance with the driving signal, so as to adjust a position and a size of the color-variable region in accordance with the external light beam. In this way, it is able to provide the anti-glare function for the driver and enable the driver to view a road condition through a part of the electrically-controlled color-variable thin film 13 which does not form the color-variable region, thereby to ensure the driving security.

When a part of the electrically-controlled color-variable thin film 13 forms the color-variable region, the status information acquired by the sensing circuit 11 may include an irradiation direction of the external light beam. The driving circuit 12 is further configured to determine the position of the color-variable region in accordance with the irradiation direction of the external light beam.

In actual use, a perceivable brightness value for a human eye is usually within a range from 0.001 nit to 1000000 nit, and the human eye may feel comfortable when the brightness value is within a range from 10 nit to 10000 nit. Hence, an intensity threshold, e.g., 10000 nit, may be set. When an intensity of the light beam detected by the sensing circuit 11 is exceeding the intensity threshold, the anti-glare device may be enabled automatically. Of course, the driver may also enable the anti-glare device manually. The sensing circuit 11 may include a photosensitive element configured to acquire the irradiation direction of the external light beam toward the vehicle (to be specific, the irradiation direction of the external light beam toward the front windshield of the vehicle or toward a driver's seat). In a possible embodiment of the present disclosure, the photosensitive element may include a wide-angle camera arranged on the vehicle body. The wide-angle camera may be arranged at a surface of a central rearview mirror facing the outside of the vehicle body. During the use, the wide-angle camera may take an image in front of the vehicle, perform grayscale processing to treatment, determine the relative coordinates in the image where the external light beam has an intensity exceeding the intensity threshold, and then calculate the high-light coordinates of the external light beam having an intensity exceeding the intensity threshold in combination with a position of the wide-angle camera on the vehicle body, e.g., the high-light coordinates of the external light beam relative to a position of the human eye. In this way, it is able for the sensing circuit 11 to acquire the irradiation direction of the external light beam toward the vehicle through the photosensitive element, e.g., the wide-angle camera.

Then, the driving circuit 12 may compare the irradiation direction acquired by the sensing circuit 11, e.g., the photosensitive element, with the pre-stored correspondence between the irradiation directions and the color-variable regions, determine the position of the color-variable region where the grating structure is to be formed, and generate the driving signal for the color-variable region, so as to merely form the grating structure in the color-variable region of the electrically-controlled color-variable thin film 13. A principle of forming the grating structure in the color-variable region will be described hereinafter in more details.

Figure 5:
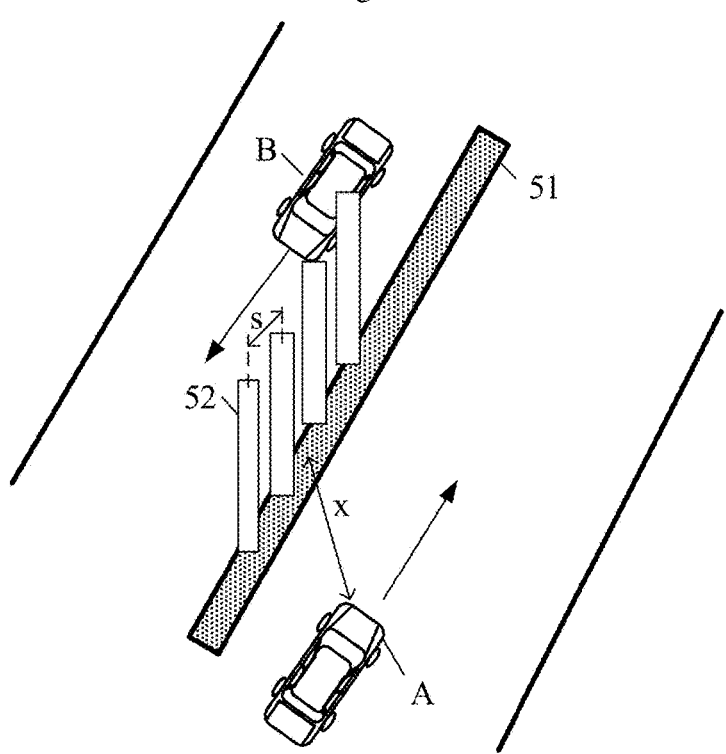
FIG. 5 is a schematic view showing a working principle of the anti-glare device according to one embodiment of the present disclosure.

Illustratively, as shown in FIG. 5, two vehicles A and B are running on the road in opposite directions, and the anti-glare device is applied to the vehicle A so as to form the grating structure on a front windshield of the vehicle A and partially shield light beams from the vehicle B.

Several road tests show that, when light-shielding plates 52 are arranged along a central line 51 of the road, it is able to effectively shield a majority of the light beams from the vehicle B due to a width of each light-shielding plate 52. In addition, although with the light-shielding plates 52, a driver in the vehicle A is still capable of acquiring a sufficient large viewing field in a transverse direction, i.e., viewing an environment in front of the vehicle, and at this time, it is able to prevent the driver from being adversely affected psychologically to some extent.

Based on the above principle, the grating structure formed through the anti-glare device on the front windshield of the vehicle A may be visually equivalent to the light-shielding plates 52 in FIG. 5. In other words, as shown in FIG. 4, the power may be supplied to the plurality of strip-like electrodes 41 alternately and dynamically in accordance with the driving signal, so as to enable a portion of the electrically-controlled color-variable layer 33 corresponding to the strip-like electrode 41, to which the power is supplied, to change its color, thereby to enable a portion of the electrically-controlled color-variable layer 33 (e.g., a portion of the electrically-controlled color-variable layer 33 corresponding to a certain strip-like electrode 41 in the color-variable region) or a plurality of portions of the electrically-controlled color-variable layer 33 (e.g., a plurality of portions of the electrically-controlled color-variable layer 33 corresponding to a plurality of strip-like electrodes 41 in the color-variable region respectively) to change its color or their colors alternately and dynamically, i.e., like a marquee. In this way, a visual effect of the grating structure formed by the anti-glare device on the front windshield of the vehicle A may be equivalent to the light-shielding plates 52 in FIG. 5, i.e., similar to an effect caused when anti-glare plates outside the vehicle move backward at a certain velocity as viewed by the driver.

Figure 6:
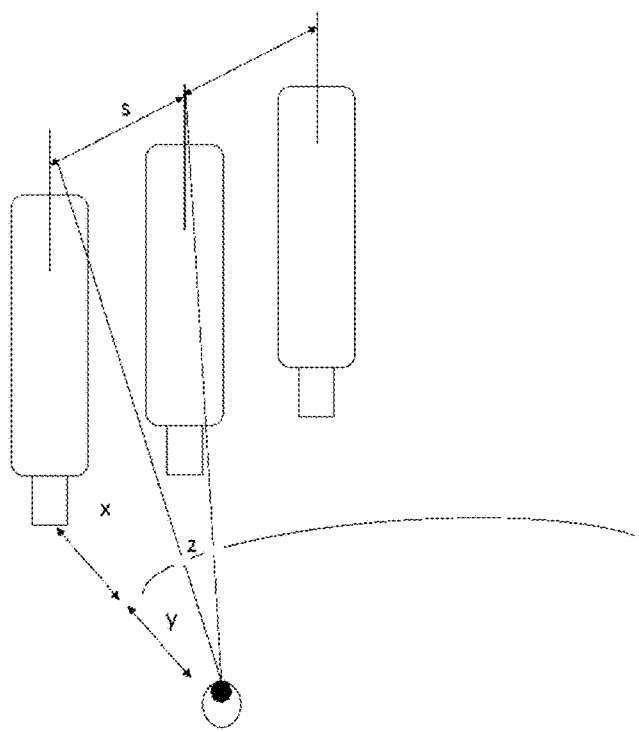
FIG. 6 is another schematic view showing the working principle of the anti-glare device according to one embodiment of the present disclosure.
Figure 7:
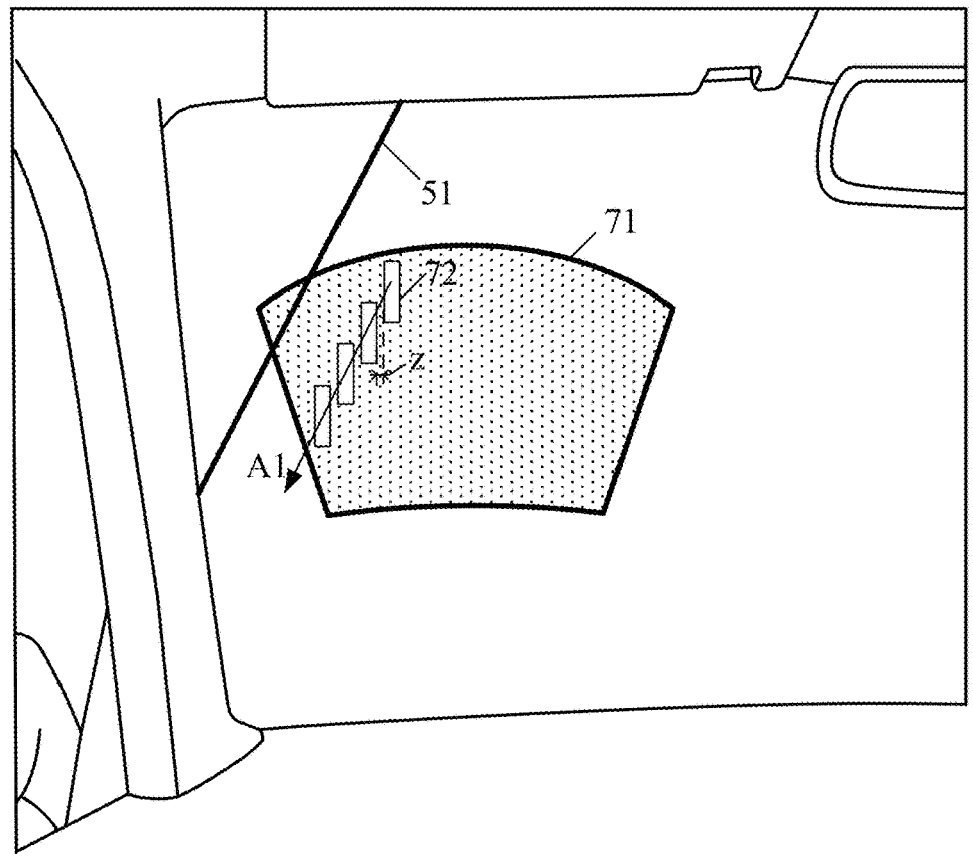
FIG. 7 is yet another schematic view showing the working principle of the anti-glare device according to one embodiment of the present disclosure.

In order to acquire the above grating structure, as shown in FIGS. 5, 6 and 7, the status information acquired by the sensing circuit 11 through the photosensitive element may further include a velocity v of the vehicle A, a distance x between the vehicle A and the central line 51 of the road viewed by the driver through the color-variable region 71, and a movement direction of the central line 51 of the road relative to the driver viewed by the driver through the color-variable region 71. The central line 51 of the road may be a central line between two parts of the road in two opposite running directions respectively.

The sensing circuit 11 may further include a vehicle velocity sensor and a binocular camera.

The vehicle velocity sensor is configured to detect the velocity v of the vehicle, and it may be a vehicle velocity sensor that has already mounted on the vehicle.

The binocular camera may include two cameras arranged at surfaces of two rearview mirrors facing a head of the vehicle respectively. The binocular camera is configured to compare images taken by the two cameras with each other, identify a spatial position of each point in front of the vehicle, and calculate the distance x between the vehicle A and the central line 51 of the road viewed by the driver through the color-variable region 71. In addition, the binocular camera is further configured to compare the images taken by the two cameras with each other, and identify the movement direction of the central line 51 of the road relative to the driver viewed by the driver through the color-variable region 71. For example, the movement direction of the central line 51 of the road relative to the driver viewed by the driver through the color-variable region 71 may be determined through comparing the images currently taken by the two cameras with each other, or comparing the images currently taken by the two cameras with the images previously taken by the two cameras.

Correspondingly, the driving circuit 12 is further configured to: determine an arrangement direction of the light-shielding stripes 72 in the grating structure (i.e., a direction indicated by an arrow μl in FIG. 7) in accordance with the movement direction of the central line 51 of the road relative to the driver viewed by the driver through the color-variable region 71, the arrangement direction of the light-shielding stripes 72 being identical to the movement direction of the central line 51 of the road relative to the driver viewed by the driver through the color-variable region 71, or identical to an extension direction of the central line 51 of the road; determine a distance z between adjacent light-shielding stripes 72 in the grating structure in accordance with the distance x between the vehicle A and the central line of the road viewed by the driver through the color-variable region 71 (here, an equation $$z = \frac{sy}{x+y},$$

may be determined in accordance with a geometrical relationship in FIG. 6, where s is a constant value, i.e., a distance between the adjacent light-shielding plates 52 in FIG. 5, and it is found through practice that s has a value within a range [50 cm, 100 cm]; and y represents a distance between the driver and the front windshield); determine a flicker frequency f of each light-shielding stripe 72 in accordance with the velocity v of the vehicle through the equation $$f = \frac{v}{s},$$

the flicker frequency being the quantity of times of each light-shielding stripes moving from a start position to an ending position of the color-variable region 71 in unit time, a movement direction of each light-shielding stripe 72 from the start position to the ending position being identical to the movement direction of the central line of the road relative to the driver viewed by the driver through the color-variable region 71; and generate the driving information so as to form the grating structure with the arrangement direction of the light-shielding stripes, the distance z between adjacent light-shielding stripes and the flicker frequency fin the color-variable region 71 of the electrically-controlled color-variable thin film.

Based on the above, for the driver, the grating structure formed by the electrically-controlled color-variable thin film may be equivalent to the light-shielding plates 52 in FIG. 5 in terms of the visual effect. In addition, the light-shielding stripe 72 is capable of moving in the color-variable region 71 at a flicker frequency f matching the velocity v of the vehicle A, so it is able to stimulate the position change of the light-shielding plates 52 when the vehicle A is running.

The anti-glare device has been described hereinabove illustratively. According to the anti-glare device in the embodiments of the present disclosure, the electrically-controlled color-variable thin film on the front windshield may form the grating structure, so as to provide the anti-glare function for the driver. It should be appreciated that, any appropriate alteration may be made by a person skilled in the art on the electrically-controlled color-variable thin film without departing from the principle of the present disclosure. For example, a light-shielding mode in the color-variable region of the electrically-controlled color-variable thin film may not be limited to the above. To be specific, the driving circuit may drive the electrically-controlled color-variable thin film to form a color-variable region with a relatively low transmittance (e.g., a transmittance smaller than 40%, such as 3%-8% or 8-40%), and this color-variable region may serve as a pair of sunglasses for the driver, so as to provide the anti-glare effect.

Figure 8:
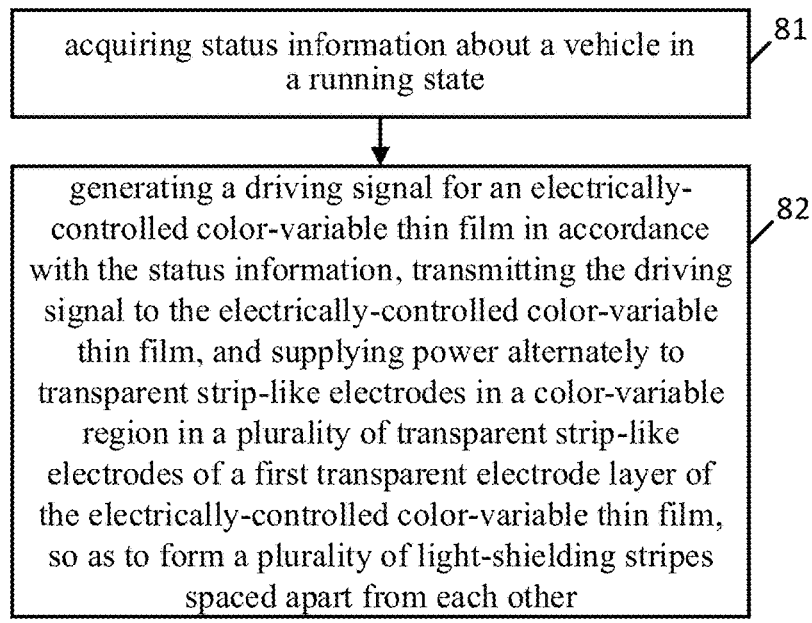
FIG. 8 is a flow chart of a control method according to one embodiment of the present disclosure.

The present disclosure further provides in some embodiments a control method for the above-mentioned anti-glare device which, as shown in FIG. 8, includes: Step 81 of acquiring status information about a vehicle in a running state; and Step 82 of generating a driving signal for an electrically-controlled color-variable thin film in accordance with the status information, transmitting the driving signal to the electrically-controlled color-variable thin film so as to enable the electrically-controlled color-variable thin film to form a color-variable region for changing a transmittance of external light beam in accordance with the driving signal, and supplying power alternately to transparent strip electrodes in the color-variable region in a plurality of transparent strip electrodes of a first transparent electrode layer and a second transparent electrode layer of the electrically-controlled color-variable thin film, so as to form a plurality of light-shielding stripes spaced apart from each other.

The control method in the embodiments of the present disclosure may be applied to the above-mentioned anti-glare device, with a same technical effect.

To be specific, a part of the electrically-controlled color-variable thin film may form the color-variable region in accordance with the driving signal, so as to provide the anti-glare function for the driver. Alternatively, the entire electrically-controlled color-variable thin film 13 may form the color-variable region in accordance with the driving signal, so as to provide the anti-glare function for the driver.

When a part of the electrically-controlled color-variable thin film 13 forms the color-variable region, the status information may include an irradiation direction of the external light beam toward the front windshield. Step 82 may include determining a position of the color-variable region in accordance with the irradiation direction, and generating the driving signal for the color-variable region.

To be specific, the color-variable region of the electrically-controlled color-variable thin film 13 may be a grating structure consisting of a plurality of light-shielding stripes spaced apart from each other. Through the grating structure, it is able to partially shield the external light beam, thereby to prevent the driver from feeling uncomfortable due to a large quantity of external light beams passing through the front windshield.

A principle of forming the grating structure in the color-variable region through the control method will be described hereinafter in more details.

To be specific, the status information may further include a velocity of the vehicle, a distance between the vehicle and a central line of a road viewed by the driver through the color-variable region, and a movement direction of the central line of the road relative to the driver viewed by the driver through the color-variable region, and the central line of the road may be a central line between two parts of the road in two opposite running directions respectively.

Step 82 may include: Step S21 of determining an arrangement direction of the light-shielding stripes in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region; Step S22 of determining a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield; Step S23 of determining a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and Step S24 of generating the driving information so as to form the grating structure with the arrangement direction of the light-shielding stripes, the distance z between adjacent light-shielding stripes and the flicker frequency f in the color-variable region of the electrically-controlled color-variable thin film.

Based on the above-mentioned control method, for the driver, the grating structure formed in the color-variable region may be equivalent to light-shielding plates arranged along the central line of the road in terms of the visual effect. In addition, the light-shielding stripe is capable of moving in the color-variable region at the flicker frequency matching the velocity of the vehicle, so it is able to stimulate the position change of the light-shielding plates when the vehicle is running.

Procedures of the control method in actual use will be described hereinafter illustratively.

Figure 9:
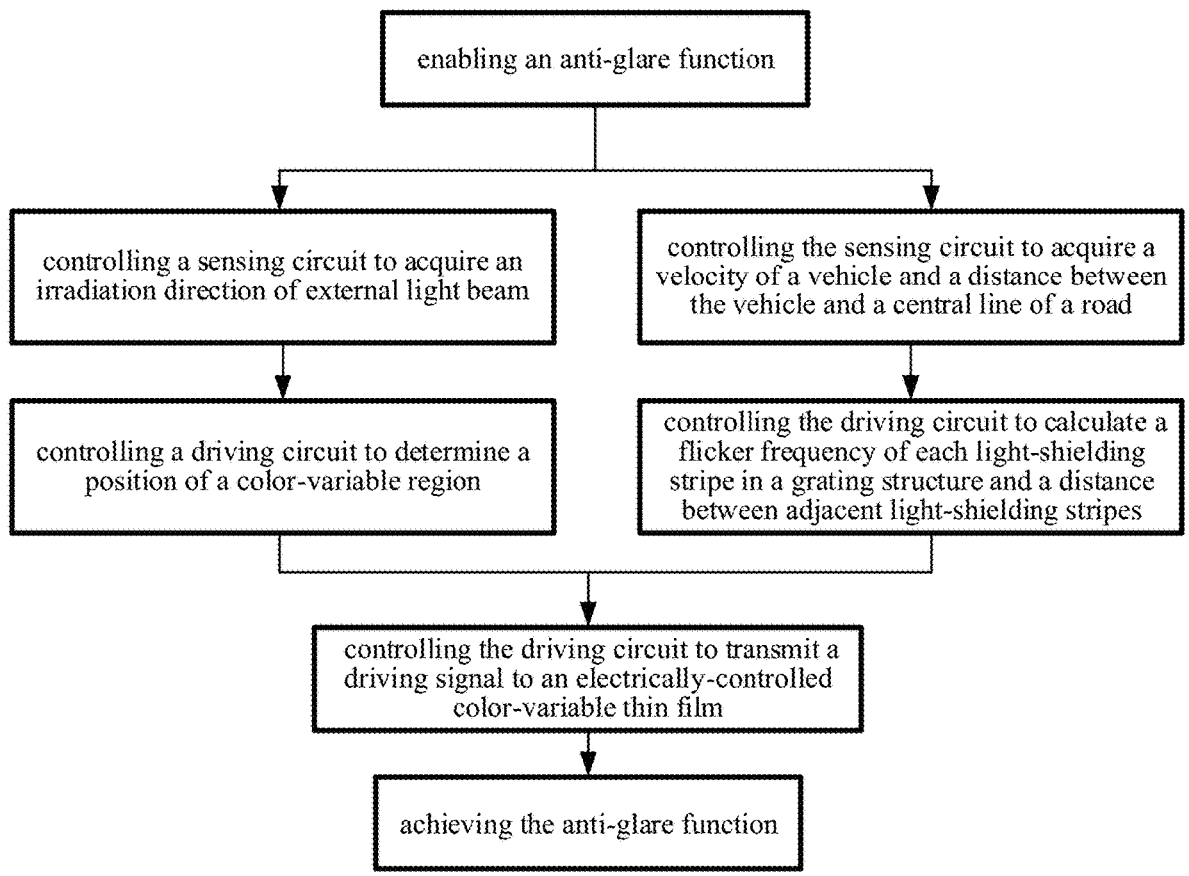
FIG. 9 is a flow chart of the control method in actual use according to one embodiment of the present disclosure.

As shown in FIG. 9, the control method in the embodiments of the present disclosure may include the following procedures.

At first, the anti-glare function may be enabled. To be specific, the anti-glare function may be enabled manually by the driver, or enabled when the external light beam has been sensed by the sensing circuit, e.g., the photosensitive element.

After the anti-glare function has been enabled, the sensing circuit may be controlled to acquire such information as the irradiation direction of the external light beam, the velocity of the vehicle, and the distance between the vehicle and the central line of the road.

Next, the driving circuit may be controlled to determine a position of the color-variable region in accordance with the irradiation direction of the external light beam, and calculate such information as the flicker frequency of each light-shielding stripe in the grating structure and the distance between the adjacent light-shielding stripes in accordance with the velocity of the vehicle and the distance between the vehicle and the central line of the road.

Finally, the driving circuit may be controlled to meet the driving signal meeting the above requirement to the electrically-controlled color-variable thin film, so as to achieve the anti-glare function through the electrically-controlled color-variable thin film.

The present disclosure further provides in some embodiments a vehicle including the above-mentioned anti-glare device. Based on the anti-glare device, it is able to shield the external light beam and prevent the driver's line of sight from being disturbed by the external light beam, thereby to improve the driving security.

In actual use, the scheme in the embodiments of the present disclosure may be particularly adapted to such large vehicles as trucks and passenger cars. These large vehicles may be less tolerant of an erroneous driving operation made by the driver, and once the driver's line of sight is disturbed by the external light beam, a traffic accident may occur due to a decline in the driver's judgment.

Figure 10:
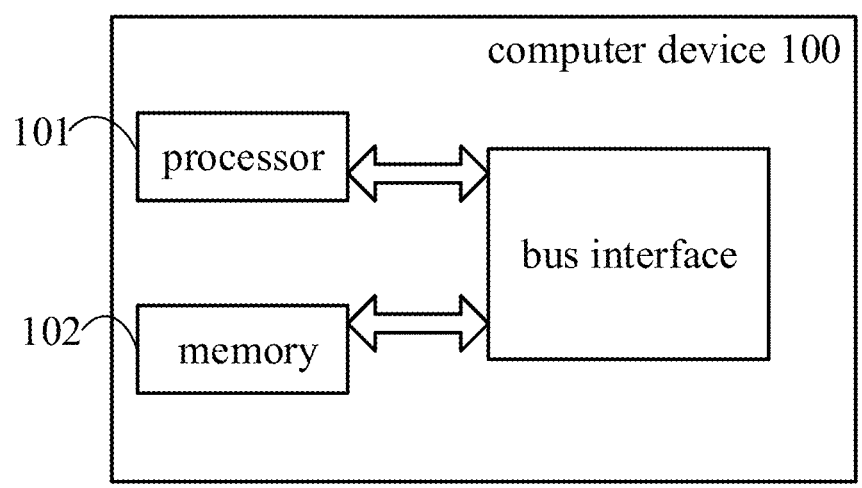
FIG. 10 is a schematic view showing a computer device according to one embodiment of the present disclosure.

The present disclosure further provides in some embodiments a computer device 100 which, as shown in FIG. 10, includes a processor 101, a memory 102, and a computer program stored in the memory 102 and executed by the processor 101.

Data may be exchanged between the processor 101 and the memory 102 via a bus interface. Bus architecture may include a number of buses and bridges connected to each other, so as to connect various circuits for one or more processors 101 and one or more memories 102. In addition, as is known in the art, the bus architecture may also be used to connect any other circuits, such as a circuit for a peripheral device, a circuit for a voltage stabilizer and a power management circuit, which are not particularly defined herein.

The processor 101 is configured to read a program stored in the memory, so as to: acquire status information about a vehicle in a running state; and generate a driving signal for an electrically-controlled color-variable thin film in accordance with the status information, and transmit the driving signal to the electrically-controlled color-variable thin film so as to enable the electrically-controlled color-variable thin film to form a color-variable region for changing a transmittance to external light beam in accordance with the driving signal.

In a possible embodiment of the present disclosure, the status information may include an irradiation direction of the external light beam toward a front windshield. The processor 101 is further configured to read the program stored in the memory, so as to determine a position of the color-variable region in accordance with the irradiation direction, and generate the driving signal for the color-variable region.

In a possible embodiment of the present disclosure, the color-variable region may be a grating structure consisting of a plurality of light-shielding stripes spaced apart from each other.

In a possible embodiment of the present disclosure, the status information may further include a velocity of the vehicle, a distance between the vehicle and a central line of a road viewed by the driver through the color-variable region, and a movement direction of the central line of the road relative to the driver viewed by the driver through the color-variable region, and the central line of the road may be a central line between two parts of the road in two opposite running directions respectively. The processor 101 is further configured to read the program stored in the memory, so as to: determine an arrangement direction of the light-shielding stripes in the grating structure in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region; determine a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield; determine a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and generate the driving information so as to form the grating structure with the arrangement direction of the light-shielding stripes, the distance z between adjacent light-shielding stripes and the flicker frequency fin the color-variable region of the electrically-controlled color-variable thin film.

The present disclosure further provides in some embodiments a computer-readable storage medium storing therein a computer program. The computer program is executed by a processor, so as to: acquire status information about a vehicle in a running state; and generate a driving signal for an electrically-controlled color-variable thin film in accordance with the status information, and transmit the driving signal to the electrically-controlled color-variable thin film so as to enable the electrically-controlled color-variable thin film to form a color-variable region for changing a transmittance to external light beam in accordance with the driving signal.

In a possible embodiment of the present disclosure, the status information may include an irradiation direction of the external light beam toward a front windshield. The computer program is executed by the processor, so as to determine a position of the color-variable region in accordance with the irradiation direction, and generate the driving signal for the color-variable region.

In a possible embodiment of the present disclosure, the color-variable region may be a grating structure consisting of a plurality of light-shielding stripes spaced apart from each other.

In a possible embodiment of the present disclosure, the status information may further include a velocity of the vehicle, a distance between the vehicle and a central line of a road viewed by the driver through the color-variable region, and a movement direction of the central line of the road relative to the driver viewed by the driver through the color-variable region, and the central line of the road may be a central line between two parts of the road in two opposite running directions respectively. The computer program is further executed by the processor, so as to: determine an arrangement direction of the light-shielding stripes in the grating structure in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region; determine a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield; determine a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and generate the driving information so as to form the grating structure with the arrangement direction of the light-shielding stripes, the distance z between adjacent light-shielding stripes and the flicker frequency fin the color-variable region of the electrically-controlled color-variable thin film.

Unless otherwise defined, any technical or scientific term used herein shall have the common meaning understood by a person of ordinary skills. Such words as "include" or "including" intends to indicate that an element or object before the word contains an element or object or equivalents thereof listed after the word, without excluding any other element or object.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An anti-glare device for a vehicle, comprising:
a sensing circuit;
a driving circuit; and
an electrically-controlled color-variable thin film,
wherein the sensing circuit is configured to acquire status information about the vehicle in a running state, the driving circuit is configured to generate a driving signal for the electrically-controlled color-variable thin film in accordance with the status information,
wherein the electrically-controlled color-variable thin film is disposed on a front windshield of the vehicle and is configured to change a transmittance to external light beam in accordance with the driving signal,
wherein the electrically-controlled color-variable thin film comprises a first transparent electrode layer, a second transparent electrode layer, and an electrically-controlled color-variable layer disposed between the first transparent electrode layer and the second transparent electrode layer,
wherein each of the first transparent electrode layer and the second transparent electrode layer consists of a plurality of transparent strip electrodes, and each transparent strip electrode of the first transparent electrode layer is arranged opposite to a corresponding transparent strip electrode of the second transparent electrode layer,
wherein the status information comprises an irradiation direction of the external light beam,
wherein the sensing circuit comprises a wide-angle camera arranged on a vehicle body and configured to take an image in front of the vehicle, perform grayscale processing to treatment, determine relative coordinates in the image where the external light beam has an intensity exceeding an intensity threshold, and calculate highlight coordinates of the external light beam having the intensity exceeding the intensity threshold in combination with a position of the wide-angle camera on the vehicle body, so as to acquire the irradiation direction,
wherein the driving circuit is configured to determine a position of a color-variable region on the electrically-controlled color-variable thin film in accordance with the irradiation direction,
wherein the electrically-controlled color-variable thin film is further configured to supply power alternately to transparent strip electrodes of the first transparent electrode layer within the color-variable region, so as to form a plurality of light-shielding stripes spaced from each other,
wherein the status information further comprises a velocity v of the vehicle, a distance between the vehicle and a central line of a road viewed by the driver through the color-variable region, and a movement direction of the central line of the road relative to the driver viewed by the driver through the color-variable region, and the central line of the road is a central line between two parts of the road in two opposite running directions respectively,
wherein the sensing circuit further comprises a vehicle velocity sensor and a binocular camera,
wherein the vehicle velocity sensor is configured to detect the velocity v of the vehicle,
wherein the binocular camera comprises two cameras arranged at surfaces of two rearview mirrors facing a head of the vehicle respectively, and configured to take the images through the two cameras, compare the images taken by the two cameras with each other, calculate the distance between the vehicle and the central line of the road viewed by the driver through the color-variable region, and identify the movement direction of the central line of the road relative to the driver viewed by the driver through the color-variable region by comparing the images taken by the two cameras with each other, and
wherein the driving circuit is further configured to:
determine an arrangement direction of the light-shielding stripes in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region;

determine a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield;

determine a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and take the arrangement direction of the light-shielding stripes, the distance between adjacent light-shielding stripes and the flicker frequency f as driving information.

2. The anti-glare device according to claim 1, wherein an orthographic projection of each one of the plurality of transparent strip electrodes of the first transparent electrode layer on the electrically-controlled color-variable thin film overlaps with an orthographic projection of one of the plurality of transparent strip electrodes of the second transparent electrode layer on the electrically-controlled color-variable thin film.

3. The anti-glare device according to claim 2, wherein the plurality of transparent strip electrodes of the first transparent electrode layer are arranged in a matrix form, and the plurality of transparent strip electrodes of the second transparent electrode layer are arranged in a matrix form.

4. The anti-glare device according to claim 1, wherein the driving circuit is further configured to compare the irradiation direction with a stored correspondence between irradiation direction and color-variable regions, and determine the position of the color-variable region on the electrically-controlled color-variable thin film.

5. The anti-glare device according to claim 1, wherein the electrically-controlled color-variable thin film is further configured to supply power alternately to the transparent strip electrodes in the color-variable region in the plurality of transparent strip electrodes of the first transparent electrode layer and the second transparent electrode layer in accordance with the arrangement direction of the light-shielding stripes, the distance between the adjacent light-shielding stripes, and the flicker frequency f.

6. The anti-glare device according to claim 1, wherein the transmittance of the color-variable region to the external light beam ranges from 0 to 40%.

7. A vehicle, comprising:
a front windshield; and
the anti-glare device according to claim 1, wherein the electrically-controlled color-variable thin film of the anti-glare device is arranged on the front windshield.

8. A control method for the anti-glare device, wherein the anti-glare device comprises:
a sensing circuit
a driving circuit and
an electrically-controlled color-variable thin film, wherein the sensing circuit is configured to acquire status information about the vehicle in a running state, the driving circuit is configured to generate a driving signal for the electrically-controlled color-variable thin film in accordance with the status information,
wherein the electrically-controlled color-variable thin film is disposed on a front windshield of the vehicle and is configured to change a transmittance to external light beam in accordance with the driving signal,
wherein the electrically-controlled color-variable thin film comprises a first transparent electrode layer, a second transparent electrode layer, and an electrically-controlled color-variable layer disposed between the first transparent electrode layer and the second transparent electrode layer,
wherein each of the first transparent electrode layer and the second transparent electrode layer consists of a plurality of transparent strip electrodes, and each transparent strip electrode of the first transparent electrode layer is arranged opposite to a corresponding transparent strip electrode of the second transparent electrode layer,
wherein the status information comprises an irradiation direction of the external light beam,
wherein the sensing circuit comprises a wide-angle camera arranged on a vehicle body and configured to take an image in front of the vehicle, perform grayscale processing to treatment, determine relative coordinates in the image where the external light beam has an intensity exceeding an intensity threshold, and calculate highlight coordinates of the external light beam having the intensity exceeding the intensity threshold in combination with a position of the wide-angle camera on the vehicle body, so as to acquire the irradiation direction,
wherein the driving circuit is configured to determine a position of a color-variable region on the electrically-controlled color-variable thin film in accordance with the irradiation direction,
wherein the control method comprises:
acquiring status information about a vehicle in a running state;
generating a driving signal for an electrically-controlled color-variable thin film in accordance with the status information, and transmitting the driving signal to the electrically-controlled color-variable thin film; and
supplying power alternately to transparent strip electrodes in a color-variable region in a plurality of transparent strip electrodes of a first transparent electrode layer of the electrically-controlled color-variable thin film, so as to form a plurality of light-shielding stripes spaced apart from each other, wherein the status information further comprises a velocity v of the vehicle, a distance between the vehicle and a central line of a road viewed by the driver through the color-variable region, and a movement direction of the central line of the road relative to the driver viewed by the driver through the color-variable region, and the central line of the road is a central line between two parts of the road in two opposite running directions respectively, and wherein the generating the driving signal for the electrically-controlled color-variable thin film in accordance with the status information comprises:

determining an arrangement direction of the light-shielding stripes in accordance with the movement direction of the central line of the road relative to the driver viewed by the driver through the color-variable region, the arrangement direction of the light-shielding stripes being identical to the movement direction of the central line of the road relative to the driver viewed by the driver through the color-variable region;

determining a distance z between adjacent light-shielding stripes in accordance with the distance x between the vehicle and the central line of the road viewed by the driver through the color-variable region through the equation $$z = \frac{sy}{x+y},$$

where s is a constant value within a range [50 cm, 100 cm], and y represents a distance between the driver and the front windshield;

determining a flicker frequency f of each light-shielding stripe in accordance with the velocity v of the vehicle through the equation $$f = \frac{v}{s},$$

the flicker frequency being the quantity of times of each light-shielding stripes moving from a start position to an ending position of the color-variable region in unit time, a movement direction of each light-shielding stripe from the start position to the ending position being identical to the movement direction of the central line of the road relative to the driver viewed by the driver through the color-variable region; and taking the arrangement direction of the light-shielding stripes, the distance between adjacent light-shielding stripes and the flicker frequency f as driving information.

9. The control method according to claim 8, wherein the acquiring the status information about the vehicle in the running state comprises:

taking an image in front of the vehicle through a wide-angle camera, subjecting the image to grayscale treatment, determining relative coordinates of external light beam having an intensity exceeding an intensity threshold, and calculating highlight coordinates of the external light beam having the intensity exceeding the intensity threshold in combination with a position of the wide-angle camera on a vehicle body, so as to acquire an irradiation direction; and determining a position of the color-variable region in accordance with the irradiation direction.

10. The control method according to claim 9, wherein the determining the position of the color-variable region in accordance with the irradiation direction comprises comparing the irradiation direction with a stored correspondence between irradiation directions and color-variable regions, and determining the position of the color-variable region on the electrically-controlled color-variable thin film.

11. The control method according to claim 8, wherein prior to determining the arrangement direction of the light-shielding stripes in accordance with the movement direction of the central line of the road relative to the driver viewed by the driver through the color-variable region, the control method further comprises taking images through two cameras, comparing the images taken by the two cameras, and identifying the movement direction of the central line of the road relative to the driver viewed by the driver through the color-variable region, wherein prior to determining the distance z between the adjacent light-shielding stripes in accordance with the distance x between the vehicle and the central line of the road viewed by the driver through the color-variable region, the control method further comprises comparing the images taken by the two cameras, and calculating the distance between the vehicle and the central line of the road viewed by the driver through the color-variable region, wherein prior to determining the flicker frequency f of the light-shielding stripe in accordance with the velocity v of the vehicle, the control method further comprises acquiring the velocity v of the vehicle.

12. The control method according to claim 8, wherein the supplying power alternately to the transparent strip electrodes in the color-variable region in the plurality of transparent strip electrodes of the first transparent electrode layer and the second transparent electrode layer of the electrically-controlled color-variable thin film so as to form the plurality of light-shielding stripes spaced apart from each other comprises:

supplying power alternately to the transparent strip electrodes in the color-variable region in the plurality of transparent strip electrodes of the first transparent electrode layer in accordance with the arrangement direction of the light-shielding stripes, the distance between the adjacent light-shielding stripes, and the flicker frequency f as well as the driving information.

13. A computer device, comprising a processor, a memory, and a computer program stored in the memory and executed by the processor, wherein the computer program is executed by the processor so as to implement the control method according to claim 8.

14. A non-transitory computer-readable storage medium storing therein a computer program, wherein the computer program is executed by a processor so as to implement the control method according to claim 8.

* * * * *